United States Patent
Allingham et al.

[11] Patent Number: 5,951,726
[45] Date of Patent: Sep. 14, 1999

[54] MODULAR FILTER BAG CAGE

[75] Inventors: Paul Allingham, Slingerlands; John Kawola, Schenectady, both of N.Y.

[73] Assignee: Albany International Corp., Albany, N.Y.

[21] Appl. No.: 08/971,110

[22] Filed: Nov. 14, 1997

[51] Int. Cl.[6] .................................................. B01D 46/02
[52] U.S. Cl. ................................. 55/379; 55/492; 55/496
[58] Field of Search .......................... 55/379, 378, 341.1, 55/492, 496

[56] References Cited

U.S. PATENT DOCUMENTS

| | | |
|---|---|---|
| 2,774,443 | 12/1956 | Slayter . |
| 3,747,307 | 7/1973 | Peshina et al. ............................ 55/379 |
| 3,853,509 | 12/1974 | Leliaert . |
| 4,141,128 | 2/1979 | Wonderling ................................ 55/379 |
| 4,259,095 | 3/1981 | Johnson, Jr. . |
| 4,290,790 | 9/1981 | Okubo ........................................ 55/379 |
| 4,695,300 | 9/1987 | Takagi . |
| 4,699,715 | 10/1987 | Lee, II . |
| 4,734,195 | 3/1988 | Lhuillier et al. . |
| 4,842,739 | 6/1989 | Tang . |
| 4,878,930 | 11/1989 | Manniso et al. . |
| 5,173,098 | 12/1992 | Pipkorn ...................................... 55/492 |
| 5,350,515 | 9/1994 | Stark et al. . |
| 5,468,382 | 11/1995 | Cook et al. . |

FOREIGN PATENT DOCUMENTS

| | | |
|---|---|---|
| 2817737 | 10/1979 | Germany ................................... 55/379 |
| 204399 | 11/1983 | Germany ................................... 55/379 |
| 9409704 U | 12/1994 | Germany . |
| 3637516 | 4/1996 | Germany . |
| 55-7287 | 2/1980 | Japan ........................................ 55/379 |
| 63-23709 | 2/1988 | Japan ........................................ 55/379 |
| 6-170136 | 6/1994 | Japan ........................................ 55/379 |
| 1109182 | 8/1984 | U.S.S.R. .................................... 55/379 |
| 20176 | 9/1912 | United Kingdom . |
| 91/06359 | 5/1991 | WIPO ....................................... 55/379 |

*Primary Examiner*—Duane S. Smith
*Attorney, Agent, or Firm*—Kane, Dalsimer, Sullivan, Kurucz, Levy, Eisele and Richard, LLP

[57] ABSTRACT

The disclosed apparatus is a filter bag cage which is modularly constructed from end caps, circumferential rings (circular or other shapes), and longitudinal wires which are individually manufactured with fastening joints to allow for later assembly. These components may be subsequently shipped and stored as an unassembled bundle and not assembled until reaching the point of use.

6 Claims, 2 Drawing Sheets

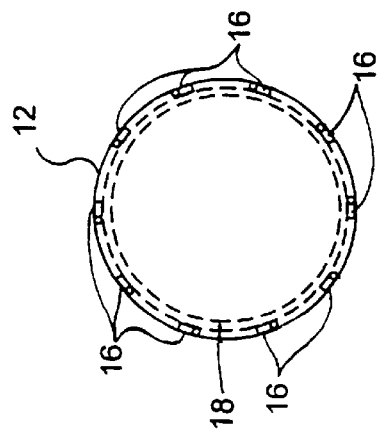
FIG. 4
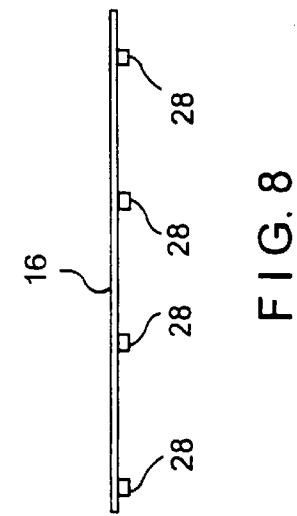
FIG. 8
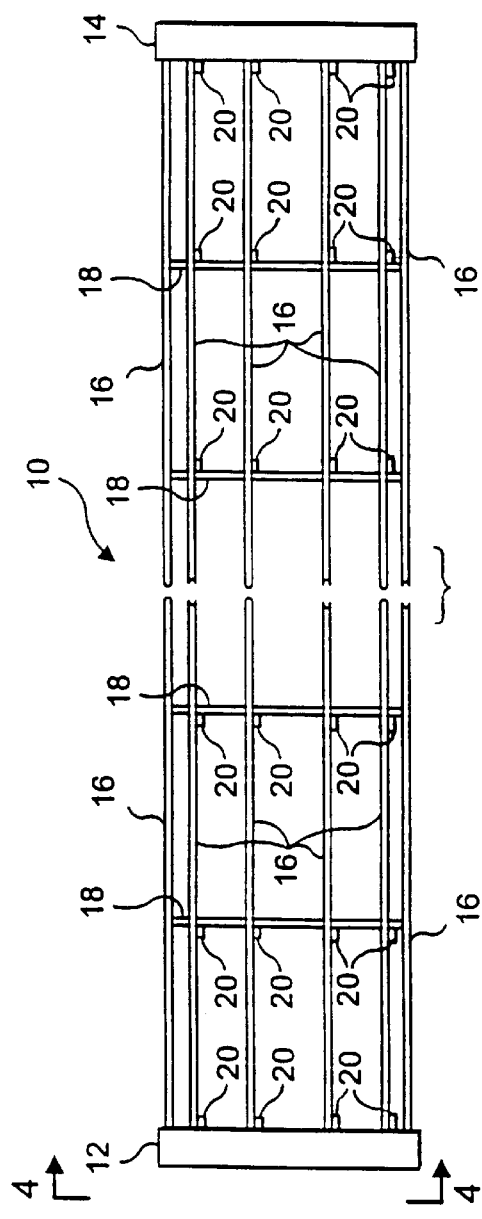
FIG. 3
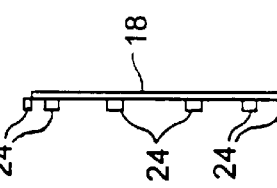
FIG. 7
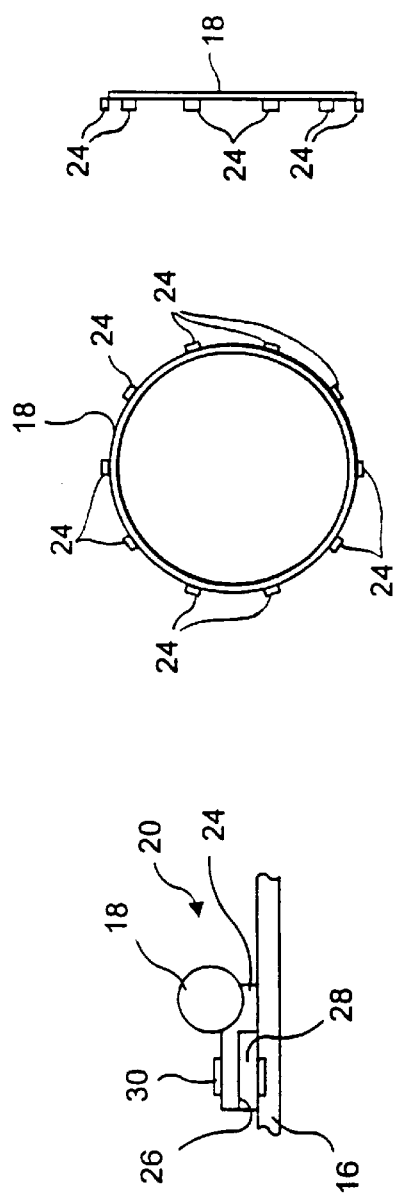
FIG. 6
FIG. 5

5,951,726

MODULAR FILTER BAG CAGE

BACKGROUND OF THE INVENTION

1. Field of the Invention

The present invention relates to a filter bag cage, in particular, a filter bag cage which is modular and may be assembled at the point of use.

2. Description of the Prior Art

Filter bags made from textile filter media are used in a variety of industries to remove particulate from gas streams. In many applications, the filter bags are supported by a wire cage or similar support mechanism. This wire cage serves to keep the filter bag open during the filter cycle which is normally under negative differential pressure. Such wire cages may be as long as twenty-seven feet, and even longer for some applications. The wire cages are manufactured using longitudinal steel wires with intermittent circumferential wires and top and bottom caps. The steel wires and other components are welded together using specialized machinery and shipped as fabricated units.

It is inherent that the assembled filter bag cage will have a large volume, but will be constructed from a relatively small amount of material with respect to the total volume of the filter bag cage. Typically, the filter bag cage is constructed of metal wire which has been welded together at the manufacturing site. This results in an unwieldy configuration which is difficult to ship from the manufacturing site to the point of use and has a high potential for damage during transit.

Similarly, such filter bag cages are frequently placed in storage. Due to the size of the filter bag cages, often a choice has to be made between expensive indoor storage or less expensive outdoor storage which exposes the filter bag cages to the elements and to damage.

OBJECTS AND SUMMARY OF THE INVENTION

It is therefore an object of this invention to provide a filter bag cage which does not have an unwieldy configuration during shipping from the manufacturing site to the point of use.

It is therefore a further object of this invention to provide a filter bag cage which can be shipped with a reduced likelihood of damage during transit.

It is therefore a yet further object of this invention to provide a filter bag cage which can be stored in a reduced volume.

It is therefore a further object of this invention to provide a filter bag cage which has substantially no increased costs in the manufacturing process.

These and other objects of the invention are attained by providing a filter bag cage which is modular, typically comprised of longitudinal steel wires or similar supports, circumferential rings, and end caps, including mating components. The filter bag cage of the present invention is manufactured as a plurality of separate rods or wires with appropriate fittings for later assembly into a filter bag cage. The plurality of separate wires, with attached fittings, are shipped in a compact configuration to the point of use. At the point of use, the user then assembles the wires into a filter bag cage.

BRIEF DESCRIPTION OF THE DRAWINGS

Further objects and advantages of the invention will become apparent from the following description and claims, and from the accompanying drawings, wherein:

FIG. 3 is a side plan view of the typical filter bag cage of the present invention.

FIG. 4 is a cross-sectional end view taken along plane 4—4 of FIG. 3 of the typical filter bag cage of the present invention.

FIG. 5 is a side plan view of the typical fastening joint of the present invention.

FIG. 6 is a front plan view of the typical circumferential ring of the filter bag cage of the present invention.

FIG. 7 is a side plan view of the typical circumferential ring of the filter bag cage of the present invention.

FIG. 8 is a side plan view of the typical longitudinal wire of the filter bag cage of the present invention.

DETAILED DESCRIPTION OF THE PREFERRED EMBODIMENT

Figure 1:
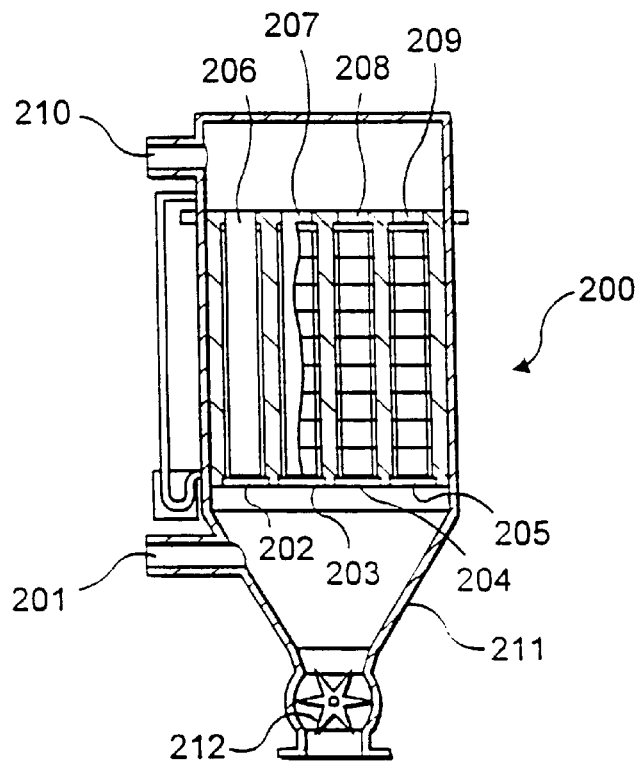
FIG. 1 is a side view of a typical filter bag application, using either the prior art filter bag cage or the filter bag cage of the present invention.

Referring now to the drawings in detail wherein like numerals refer to like elements throughout the several views, FIG. 1 shows a typical application of a filter bag cage, using either the prior art filter bag cage or the filter bag cage of the present invention. Containment vessel 200 includes a lower lateral input aperture 201 into which a particulate stream to be filtered is input. A plurality of filter bag cages 202, 203, 204, 205 supports corresponding plurality of filters bags 206, 207, 208, 209 so as to expose the filter bags 206–209 against the particulate stream and to prevent the filter bags 206–209 from collapsing. The particulate stream is filtered as the particulate stream passes through the filters 206–209. The filtered stream thereafter passes out through upper lateral output aperture 210. The filtered particulates accumulate on the filter bags 206–209 and eventually drop to the inverted conical lower portion 211 of containment vessel 200 to be removed by sweeping device 212.

Figure 2:
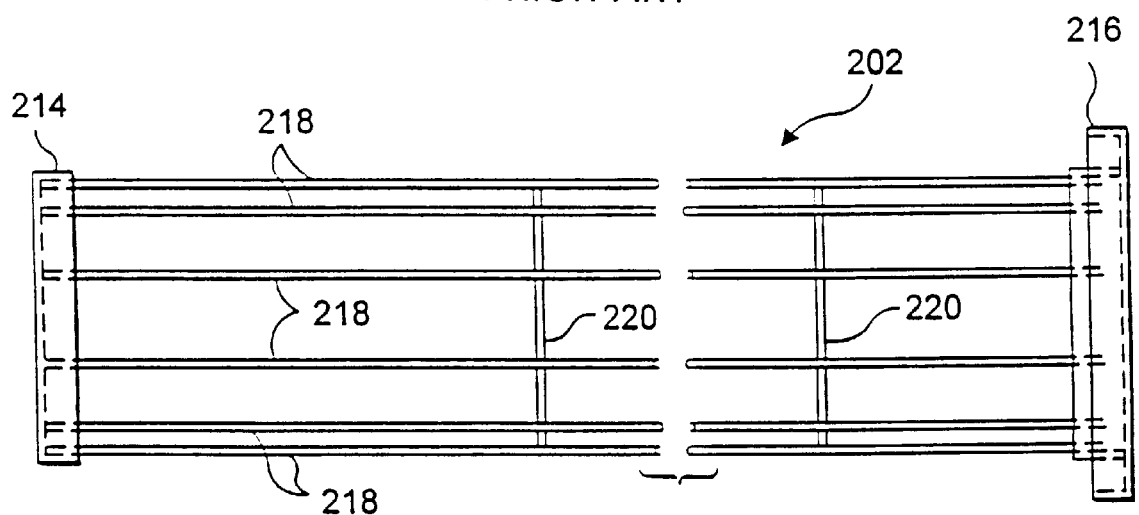
FIG. 2 is a side plan view of a typical prior art filter bag cage.

FIG. 2 shows the typical configuration of a prior art filter bag cage 202. Filter bag cage 202 includes opposed hollow circular or toroidal end caps 214, 216 with longitudinal wires 218 spanning therebetween. Longitudinal wires are further supported by intermediate circular circumferential rings 220 (shapes other than circular may be used for some applications). All of the components of filter bag cage 202 are typically metal and are welded together during the original manufacture and subsequently shipped, stored and installed.

FIG. 3 shows the typical filter bag cage 10 of the present invention with end caps 12, 14, longitudinal wires 16 and circular circumferential rings 18 in similar orientation as shown in FIG. 2 (end caps 12, 14 may be omitted in some applications). However, the various components are not welded together but rather held in place by fastening joints 20 (described hereinafter with respect to FIG. 5). This allows the (optional) end caps 12, 14, longitudinal rods or wires 16 and circular circumferential rings 18 to be individually manufactured and subsequently shipped and stored as an unassembled bundle to the point of use. At the point of use, the installer assembles the various components and fastens these components together using the fastening joints 20 and then installs the resulting filter bag cage 10 in a configuration similar to that shown in FIG. 1. Other means for fastening such as using nuts, screws, clips or other means suitable for the purpose may, of course, be utilized.

FIG. 4 shows a cross-sectional view along plane 4—4 of FIG. 3, particularly showing the typical relationship of the longitudinal wires 16 to circumferential wire 18.

FIG. 5 shows the typical fastening joints 20 (those skilled in the art will realize that other fastening joint configurations suitable for the purpose as aforesaid are possible) used to connect the circular (or other shaped) circumferential rings 18 or end cape 12, 14 to the straight longitudinal wires 16. The circular wire portion 18 which forms the periphery of the circumferential rings 18 or end caps 12, 14 is coupled with a rectangular portion 24 with a lower notch 26. The longitudinal wire 16 is coupled with a guide portion 28 which is complementary to the lower notch 26 of the rectangular portion 24. Guide portion 28, which is coupled with longitudinal wire 16, after assembly fits into lower notch 26 of rectangular portion 24 which is coupled to circumferential ring 18 or end cap 12 or 14. Bolt 30 or similar fastening means thereafter passes through rectangular portion 24 and guide portion 28 and thereby fastens the longitudinal wires 16 to circumferential rings 18 or end cap 12 or 14.

FIGS. 6 and 7 show a front view and side view, respectively, of a typical circumferential ring 18 (which may be circular or of other shapes) of the filter bag cage 10 of the present invention. The rectangular portions 24 of fastening joints 20 are spaced periodically around the circumference of the ring 18 for fastening to guide portions 28 of fastening joints 20 thereby supporting the longitudinal wires 16.

FIG. 8 shows a typical longitudinal wire 16 with guide portions 28 of fastening joints 20 spaced periodically along the span thereof for fastening to the rectangular portions 24 thereby supporting circumferential rings 18.

In order to use the filter bag cage 10 of the present invention, the end caps 12, 14, longitudinal wires 16 and circular (or other shaped) circumferential rings 18 are individually manufactured at the manufacturing site and subsequently shipped and stored as an unassembled bundle. At the point of use, the various pieces are assembled using the fastening joints as described above resulting in the filter bag cage of FIG. 3 which is then installed, a typical installation of which being shown in FIG. 1.

Thus the several aforementioned objects and advantages are most effectively attained. Although a single preferred embodiment of the invention has been disclosed and described in detail herein, it should be understood that this invention is in no sense limited thereby and its scope is to be determined by that of the appended claims.

What is claimed is:

1. A filter bag cage comprising:

a plurality of longitudinal elements, a plurality of support elements, said plurality of longitudinal elements includes first portions of locking elements, said plurality of support elements includes second portions of locking elements for engaging respective first portions of locking elements, and wherein said first and second portions of said locking elements join to form the filter bag cage from said plurality of longitudinal elements and said plurality of support elements.

2. The filter bag cage of claim 1 wherein said plurality of longitudinal elements are wires or rods; and wherein said plurality of longitudinal elements and said plurality of support elements ar manufactured separately for assembly at a point of use.

3. The filter bag cage of claim 2 wherein said plurality c longitudinal elements are supported perpendicular to said plurality of support elements.

4. The filter bag cage of claim 3 wherein said second portions of said locking elements include a rectangular portion perpendicular to said elements, said rectangular portion further including a notch, wherein said first portions of said locking elements include a guide portion complementary to said notch, said guide portion being parallel with said longitudinal wires.

5. The filter bag cage of claim 4 wherein said locking elements further include means for fastening said first portion of said locking elements to said second portion of said locking elements.

6. The filter bag cage of claim 5 wherein said support elements include end cap elements for engaging proximate to ends of said longitudinal wires.

\* \* \* \* \*